United States Patent
Kim et al.

(10) Patent No.: US 11,789,876 B2
(45) Date of Patent: Oct. 17, 2023

(54) DEVICE INCLUDING PERIPHERAL INTERFACE AND OPERATING METHOD OF THE DEVICE

(71) Applicant: SAMSUNG ELECTRONICS CO., LTD., Suwon-si (KR)

(72) Inventors: Boojin Kim, Anyang-si (KR); Sukmin Kang, Suwon-si (KR); Shinkyu Park, Yongin-si (KR); Boyoung Kim, Hwaseong-si (KR); Sukwon Ryoo, Seoul (KR)

(73) Assignee: Samsung Electronics Co., Ltd.

( * ) Notice: Subject to any disclaimer, the term of this patent is extended or adjusted under 35 U.S.C. 154(b) by 29 days.

(21) Appl. No.: 17/191,817

(22) Filed: Mar. 4, 2021

(65) Prior Publication Data
US 2022/0066951 A1     Mar. 3, 2022

(30) Foreign Application Priority Data
Aug. 28, 2020   (KR) ........................ 10-2020-0109472

(51) Int. Cl.
    *G06F 13/10*           (2006.01)
    *G06N 20/00*           (2019.01)

(52) U.S. Cl.
    CPC ........... *G06F 13/102* (2013.01); *G06N 20/00* (2019.01)

(58) Field of Classification Search
    CPC .............................. G06F 13/102; G06N 20/00
    USPC ........................................................ 710/158
    See application file for complete search history.

(56) References Cited

U.S. PATENT DOCUMENTS

| | | | |
|---|---|---|---|
| 7,831,842 B2 | 11/2010 | Adachi et al. | |
| 8,171,320 B2 | 5/2012 | Konaka et al. | |
| 9,436,253 B2 | 9/2016 | Lee et al. | |
| 10,345,887 B2 * | 7/2019 | Hsiao | G06F 1/3287 |
| 10,402,205 B2 | 9/2019 | Pan | |
| 11,216,055 B2 * | 1/2022 | Lee | G06F 1/3296 |
| 2010/0005323 A1 | 1/2010 | Kuroda et al. | |
| 2012/0254878 A1 * | 10/2012 | Nachman | G06F 1/3293 718/102 |
| 2014/0189376 A1 * | 7/2014 | Rotem | G06F 1/3296 713/300 |
| 2014/0288866 A1 * | 9/2014 | Lee | G01D 18/00 702/89 |
| 2017/0082651 A1 * | 3/2017 | Liou | G01C 22/006 |
| 2019/0042121 A1 * | 2/2019 | Vergis | G06F 3/0673 |
| 2019/0129498 A1 * | 5/2019 | Leung | G06F 1/206 |
| 2019/0250691 A1 * | 8/2019 | Lee | G06F 1/3293 |

(Continued)

FOREIGN PATENT DOCUMENTS

JP        2006268246 A     10/2006

*Primary Examiner* — Christopher B Shin
(74) *Attorney, Agent, or Firm* — Fish & Richardson P.C.

(57) ABSTRACT

A device including an interface with peripherals includes a first interface that receives a request from a host, a second interface that periodically receives at least one first sample input from the peripherals in response to the request from the host, a memory that stores an active time table including a processing time of a sample input provided by each of the peripherals in each of a plurality of operating conditions respectively corresponding to different power consumptions, and a processing circuit that identifies at least one of the plurality of operating conditions based on the active time table and a period of the at least one first sample input.

18 Claims, 15 Drawing Sheets

(56) References Cited

U.S. PATENT DOCUMENTS

2020/0349835 A1\* 11/2020 Trim .................. G08G 1/22
2020/0393885 A1\* 12/2020 Ghosh ................ G06F 1/28

\* cited by examiner

DEVICE INCLUDING PERIPHERAL INTERFACE AND OPERATING METHOD OF THE DEVICE

CROSS-REFERENCE TO RELATED APPLICATION

This application is based on and claims priority under 35 U.S.C. § 119 to Korean Patent Application No. 10-2020-0109472, filed on Aug. 28, 2020, in the Korean Intellectual Property Office, the disclosure of which is incorporated by reference herein in its entirety.

BACKGROUND

The disclosure relates to a peripheral interface, and more particularly, to a device including a peripheral interface and an operating method of the device.

When a host controlling a system directly communicates with various peripherals included in the system, the performance of the host may deteriorate and a freedom of adding peripherals to the system may be restricted. Accordingly, a system may include an interface device between the peripherals and a host, and the host may obtain information from the peripherals through the interface device. As the number of peripherals included in a system increases, high performance may be required for a device that interfaces with peripherals, and in the case of a mobile system, high efficiency may be also required for a device that interfaces with peripherals.

SUMMARY

The disclosure provides a device and method for interfacing with peripherals with optimal power consumption.

According to an aspect of the disclosure, there is provided a device providing an interface with peripherals, the device including a first interface that receives a request from a host, a second interface that periodically receives at least one first sample input from the peripherals in response to the request from the host, a memory that stores an active time table including a processing time of a sample input provided by each of the peripherals in each of a plurality of operating conditions respectively corresponding to different power consumptions, and a processing circuit that identifies at least one of the plurality of operating conditions based on the active time table and a period of the at least one first sample input.

According to another aspect of the disclosure, there is provided a device including a host that performs an operation based on information provided from peripherals, a hub device that provides an interface for the peripherals, and a dynamic voltage-frequency scaling (DVFS) circuit that adjusts power consumption of the hub device based on a control signal provided from the hub device. The hub device periodically receives at least one sample input from the peripherals in response to a request from the host and generates the control signal based on a processing time and period of the at least one sample input.

According to another aspect of the disclosure, there is provided a method of interfacing with peripherals, the method including receiving, from a host, a request instructing periodic reception of at least one sample input from the peripherals, identifying a processing time and period of the at least one sample input, and identifying at least one of a plurality of operating conditions corresponding to different power consumptions, based on the processing time and period of the at least one sample input.

BRIEF DESCRIPTION OF THE DRAWINGS

Embodiments of the disclosure will be more clearly understood from the following detailed description taken in conjunction with the accompanying drawings in which.

DETAILED DESCRIPTION OF THE EMBODIMENTS

Figure 1:
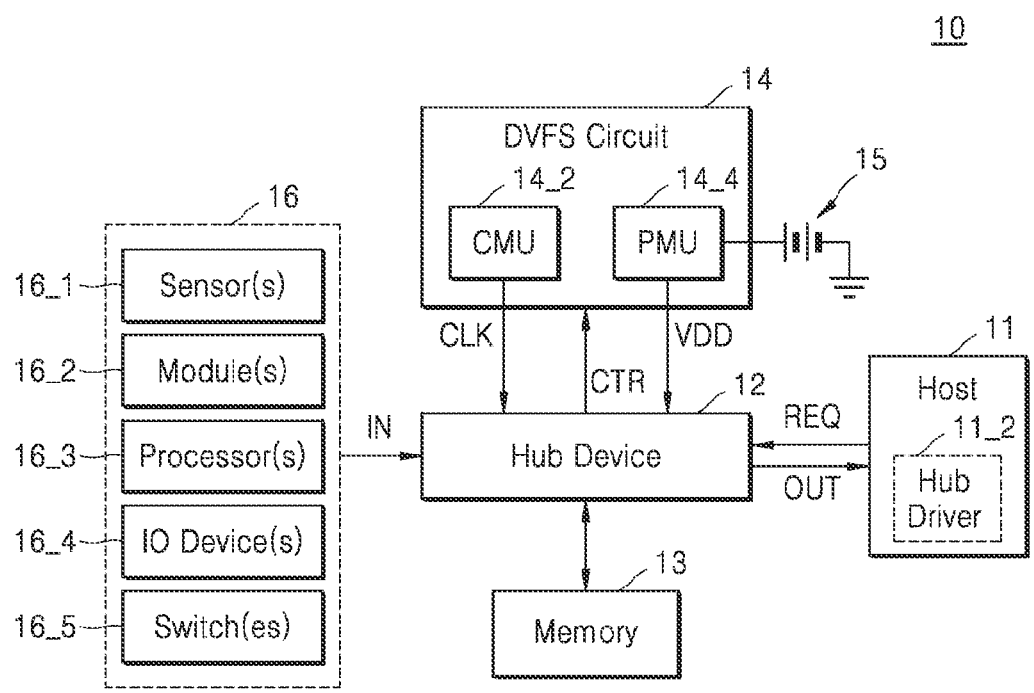
FIG. 1 is a block diagram of a system according to an example embodiment of the disclosure.

FIG. 1 is a block diagram of a system 10 according to an example embodiment of the disclosure. As shown in FIG. 1, the system 10 may include a host 11, a hub device 12, a memory 13, a dynamic voltage-frequency scaling (DVFS) circuit 14, a battery 15, and peripherals 16. In some embodiments, the battery 15 may be omitted. In some embodiments, at least some of the host 11, the hub device 12, the memory 13, and the DVFS circuit 14 may be included in one semiconductor package. In some embodiments, the host 11, the hub device 12, the memory 13 and the DVFS circuit 14 may be included in one chip, i.e., a system-on-chip (SoC), and the SoC may be referred to as an application processor (AP).

The system 10 may refer to any system including the peripherals 16 described below. For example, the system 10 may be a stationary computing system such as a desktop personal computer (PC) and a server, a portable computing system such as a laptop PC, a mobile phone, a tablet PC, and a smart wearable device, or a vehicle such as a car, a motorcycle, or an electric kickboard. The system 10 may provide various functions to a user of the system 10 or other systems through the peripherals 16.

The peripherals 16 may refer to any devices designed to provide useful functions. For example, as shown in FIG. 1, the peripherals 16 may include at least one sensor 16_1, at least one module 16_2, at least one processor 16_3, and at least one input/output device 16_4 and may include at least one switch 16_5 connected to additional peripherals. In some embodiments, unlike in FIG. 1, the system 10 may include only some of the peripherals 16 shown in FIG. 1, or further include a peripheral not shown in FIG. 1. Each of the peripherals 16 may be enabled by the hub device 12, and at least one of the peripherals 16, which is enabled, may provide a sample input IN to the hub device 12.

The at least one sensor 16_1 may detect the external environment of the system 10 and/or the state of the system 10, and may include, as a non-limiting example, an acceleration sensor, a gyroscope, a geomagnetic sensor, a proximity sensor, an air pressure sensor, a temperature sensor, a pressure sensor, and/or the like. The at least one module 16_2 may process a signal provided from the outside of the system 10, and may include, as a non-limiting example, a global navigation satellite system (GNSS) module, a wired communication module (e.g., a universal serial bus (USB) module or an Ethernet module), a wireless communication module (e.g., a WiFi module, a Bluetooth module, a near field communication (NFC) module, or an infrared communication module), a storage interface (e.g., a secure digital (SD) card, a multi-media card (MMC), or a universal flash storage (UFS)) module, and/or the like. The at least one processor 16_3 may process signals and/or data, and may include, as a non-limiting example, a communication processor (or a modem), a codec, and/or the like. The at least one input/output device 16_4 may receive an input from the outside of the system 10 or provide an output to the outside of the system 10, and may include, as a non-limiting example, a touch screen, a keyboard, a mouse, a display device, an audio device (e.g., a microphone, a speaker, or an audio amplifier), and/or the like.

The host 11 may control the system 10 and may be referred to as a host processor, a host device, or the like. In some embodiments, the host 11 may include at least one core that executes a series of instructions, and may execute a program composed of instructions. The program may include a plurality of subprograms, and the subprogram may be referred to as a subroutine, a routine, a procedure, a function, or the like. In some embodiments, the host 11 may include at least one intellectual property (IP) core designed by logic synthesis and/or a field programmable gate array (FPGA). Hereinafter, it is assumed that the host 11 includes at least one core for executing a program, but it is noted that example embodiments of the disclosure are not limited thereto.

As shown in FIG. 1, the host 11 may execute a hub driver 11_2. For example, the host 11 may run an operating system (OS), and the OS may include the hub driver 11_2. The hub driver 11_2 may provide an interface for the hub device 12 to applications running on the OS. The hub driver 11_2 may generate a request REQ for the peripherals 16 independently or according to an instruction of an application, and the host 11 may provide the request REQ to the hub device 12. In addition, the host 11 may receive output data OUT including information related to the peripherals 16 from the hub device 12, and the hub driver 11_2 may independently utilize the output data OUT or provide the output data OUT to applications. In some embodiments, the host 11 may include a dedicated hardware block designed to perform the function of the hub driver 11_2.

The hub device 12 may be between the peripherals 16 and the host 11 and interface the peripherals 16 with the host 11. The hub device 12 may communicate with the peripherals 16 and receive a sample input IN from the peripherals 16. For example, the hub device 12 may communicate with a plurality of peripherals connected to a bus such as a peripheral component interconnect express (PCIe), or may communicate with a peripheral through a dedicated communication channel. In addition, the hub device 12 may communicate with the host 11, may receive a request REQ from the host 11, and may provide output data OUT to the host 11. For example, the hub device 12 may be connected to a bus such as an advanced extensible interface (AXI) together with the host 11, and may, through the bus, receive a request REQ from the host 11 or provide output data OUT to the host 11. The hub device 12 may enable at least one of the peripherals 16 based on the request REQ, and may generate the output data OUT based on a sample input IN provided from the enabled at least one peripheral. In some embodiments, the hub device 12 and the host 11 may be included in one semiconductor package, or may be implemented as separate semiconductor packages mounted on a board. The hub device 12 may be referred to as a sensor hub when the peripherals 16 include only sensors, and may be referred to as a context hub when the peripherals 16 include sensors and other peripherals.

The hub device 12 may receive a clock signal CLK and a power supply voltage VDD from the DVFS circuit 14 and may provide a control signal CTR to the DVFS circuit 14. For example, the hub device 12 may operate in synchronization with the clock signal CLK and may operate based on power provided by the power supply voltage VDD. The performance and power consumption of the hub device 12 may depend on the magnitude of the power supply voltage VDD and the frequency of the clock signal CLK. For example, as the magnitude of the power supply voltage VDD increases and the frequency of the clock signal CLK increases, the performance of the hub device 12 may be improved while the power consumption of the hub device 12 may increase. Accordingly, the performance and power consumption of the hub device 12 may vary depending on the frequency of the clock signal CLK and the magnitude of the power supply voltage VDD. In addition, a plurality of operating conditions of the hub device 12 corresponding to combinations of the frequency of the clock signal CLK and the magnitude of the power supply voltage VDD may be defined, and the plurality of operating conditions may correspond to different performances and/or power consumptions. Hereinafter, for convenience of description, example embodiments of the disclosure will be mainly described with reference to operating conditions corresponding to frequencies of the clock signal CLK.

As will be described below with reference to the drawings, the hub device 12 may estimate optimal power consumption based on a processing time and period of the sample input IN, and may generate a control signal CTR corresponding to the estimated optimal power consumption and provide the control signal CTR to the DVFS circuit 14. Accordingly, the hub device 12 may enable interfacing of the peripherals 16 with optimum power consumption, and the performance and efficiency of the system 10 may be improved. In addition, the hub device 12 may estimate optimal power consumption for interfacing of the peripherals 16 despite variations in the peripherals 16 included in the system 10. In addition, due to the high compatibility of the hub device 12 with the peripherals 16, various peripherals depending on users of the hub device 12, for example, manufacturers of the system 10 may be easily supported. Accordingly, the hub device 12 or a device including the hub device 12 (e.g., a device including the hub device 12 and the host 11) may be freely designed and manufactured, and consequently, the productivity of the hub device 12 or a device including the hub device 12 may significantly increase.

The memory 13 may be accessed by the hub device 12, and the hub device 12 may interface with the peripherals 16 by storing data in the memory 13 or reading data stored in the memory 13. The memory 13 may include a volatile memory device such as static random access memory (SRAM) or dynamic random access memory (DRAM), or may include a nonvolatile memory device such as flash memory or resistive random access memory (RRAM). In some embodiments, as will be described below with reference to FIGS. 3 and 4, the memory 13 may store an uptime (i.e., an active time) table. In some embodiments, unlike in FIG. 1, the memory 13 may be included in the hub device 12. Furthermore, in some embodiments, the memory 13 may be accessed by the host 11.

The DVFS circuit 14 may provide the power supply voltage VDD and the clock signal CLK to the hub device 12 and receive the control signal CTR from the hub device 12. As shown in FIG. 1, the DVFS circuit 14 may include a clock management unit (CMU) 14_2 and a power management unit (PMU) 14_4. The CMU 14_2 may generate the clock signal CLK and adjust the frequency of the clock signal CLK based on the control signal CTR. For example, the CMU 14_2 may include an oscillator that generates a clock signal CLK based on the control signal CTR. The CMU 14_2 may also be referred to as a clock generator or a clock generator circuit. The PMU 14_4 may generate the power supply voltage VDD, and may adjust the magnitude of the power supply voltage VDD based on the control signal CTR. For example, the PMU 14_4 may include a switching regulator that generates a power supply voltage VDD from a voltage provided from the battery 15 based on the control signal CTR. The PMU 14_4 may also be referred to as a power management integrated circuit (PMIC).

Figure 2:
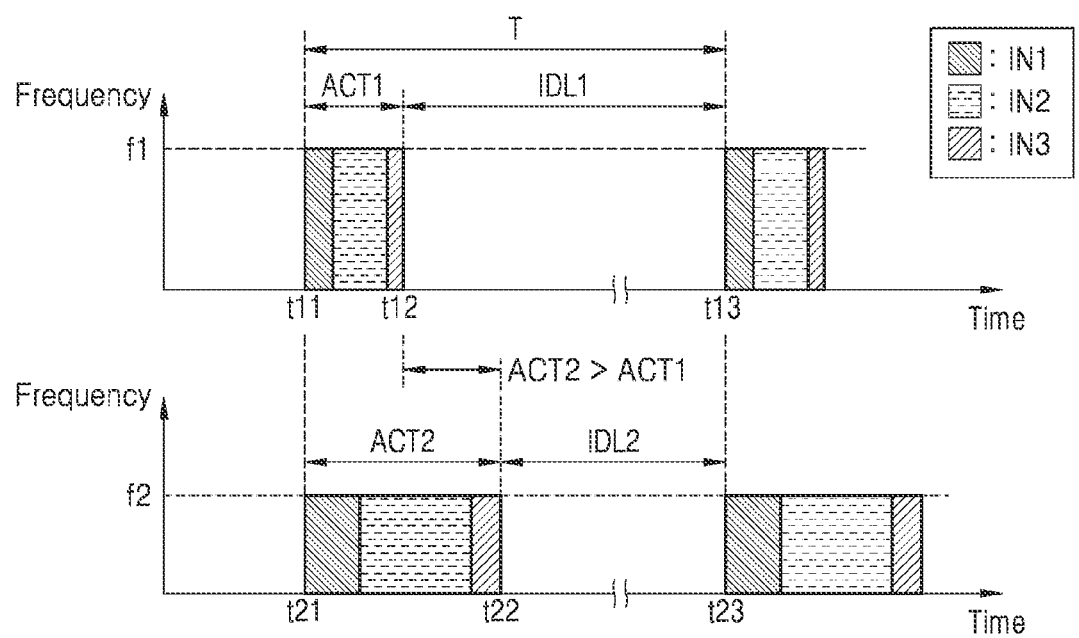
FIG. 2 is a timing diagram illustrating an operation of a hub device, according to an example embodiment of the disclosure.

FIG. 2 is a timing diagram illustrating an operation of a hub device, according to an example embodiment of the disclosure. Specifically, as an example of different operating conditions, the timing diagram of FIG. 2 shows examples of operations of the hub device 12 of FIG. 1 at different frequencies of the clock signal CLK. In FIG. 2, it is assumed that a first frequency f1 of the clock signal CLK is higher than a second frequency f2 (f1>f2), and the timing diagram of FIG. 2 will be described with reference to FIG. 1.

The request REQ provided from the host 11 may instruct the hub device 12 to periodically receive and process the sample input IN. For example, as shown in FIG. 2, the hub device 12 may receive first to third sample inputs IN1 to IN3 from first to third peripherals included in the peripherals 16 every period T and process the received first to third sample inputs IN1 to IN3. Accordingly, the hub device 12 may be required to complete the reception and/or processing of the first to third sample inputs IN1 to IN3 within the period T. As will be described below with reference to FIG. 7, the first to third sample inputs IN1 to IN3 may respectively correspond to different periods.

Referring to the upper part of FIG. 2, when the clock signal CLK has the first frequency f1, the first to third sample inputs IN1 to IN3 may be processed from time t11 to time t12. Herein, a time during which a sample input is processed by the hub device 12 may be referred to as an active time (i.e., an uptime), and as shown in FIG. 2, the first to third sample inputs IN1 to IN3 may be processed during a first active time ACT1. A sample input may not be processed from time t12 to time t13, that is, during a first idle time IDL1, and the first to third sample inputs IN1 to IN3 may be processed again from time t13.

Referring to the lower part of FIG. 2, when the clock signal CLK has the second frequency f2, the first to third sample inputs IN1 to IN3 may be processed from time t21 to time t22, that is, during a second active time ACT2. Due to the second frequency f2 being less than the first frequency f1, a time (i.e., the second active time ACT2) required to process the first to third sample inputs IN1 to IN3 may be longer than the first active time ACT1 (ACT2>ACT1). A sample input may not be processed from time t22 to time t23, that is, during a second idle time IDL2, and the first to third sample inputs IN1 to IN3 may be processed again from time t23. Because all the first to third sample inputs IN1 to IN3 are processed within the period T at the second frequency f2 of the clock signal CLK, the hub device 12 may reduce power, which is consumed by the hub device 12, by generating the control signal CTR such that the clock signal CLK has the second frequency f2.

Figure 3:
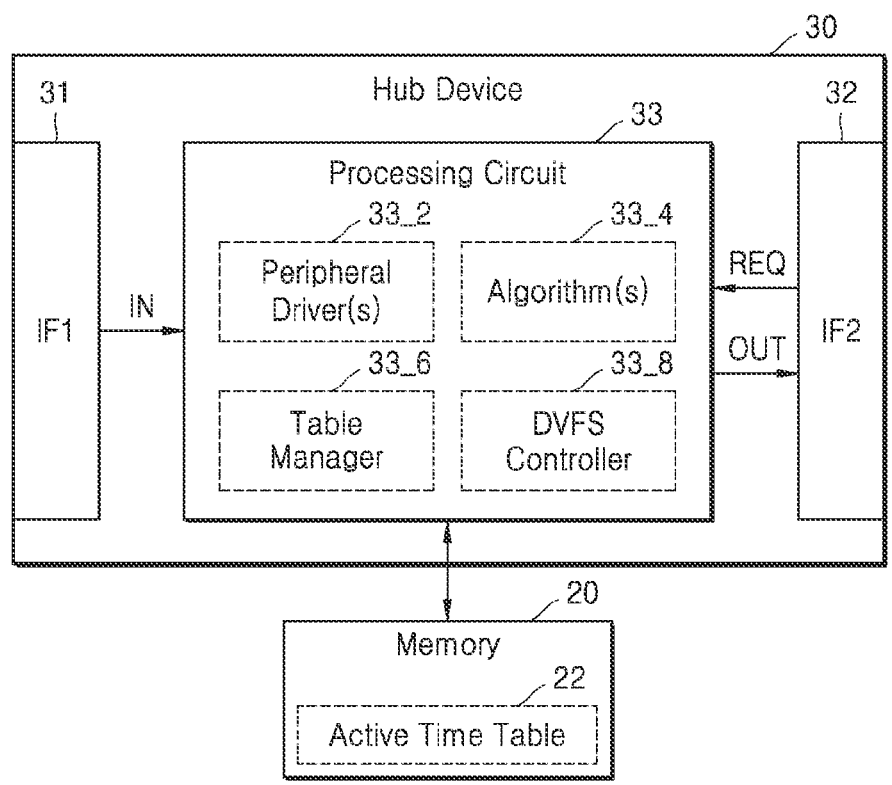
FIG. 3 is a block diagram of a hub device according to an example embodiment of the disclosure.

FIG. 3 is a block diagram of a hub device 30 according to an example embodiment of the disclosure. As described above with reference to FIG. 1, the hub device 30 of FIG. 3 may receive a request REQ and a sample input IN, generate output data OUT and a control signal CTR, and access a memory 20. As shown in FIG. 3, the hub device 30 may include a first interface 31, a second interface 32, and a processing circuit 33. Hereinafter, it is assumed that the hub device 30 of FIG. 3 communicates with the peripherals 16 and the host 11 of FIG. 1.

The first interface 31 may form a communication channel with the peripherals 16 and may receive a sample input IN from the peripherals 16. For example, the first interface 31 may implement a physical layer in a communication protocol with the peripherals 16. The second interface 32 may form a communication channel with the host 11, receive a request REQ from the host 11, and provide output data OUT to the host 11. For example, the second interface 32 may implement a physical layer in a communication protocol with the host 11.

The processing circuit 33 may receive a sample input IN from the peripherals 16 through the first interface 31 and receive a request REQ from the host 11 through the second interface 32. In addition, the processing circuit 33 may provide output data OUT to the host 11 through the second interface IF2. In some embodiments, the processing circuit 33 may include at least one core that executes a series of instructions, and may execute a program composed of instructions. Furthermore, in some embodiments, the processing circuit 33 may include at least one IP core designed by logic synthesis and/or an FPGA. As shown in FIG. 3, the processing circuit 33 may execute a plurality of subprograms, i.e., at least one peripheral driver 33_2, at least one algorithm 33_4, a table manager 33_6, and a DVFS controller 33_8. Hereinafter, it is assumed that the processing circuit 33 includes at least one core that executes a program including a plurality of subprograms, but it is noted that example embodiments of the disclosure are not limited thereto. That is, in some embodiments, the processing circuit 33 may include at least one dedicated hardware block designed to perform at least one function from among the at least one peripheral driver 33_2, the at least one algorithm 33_4, the table manager 33_6, and the DVFS controller 33_8. Hereinafter, that the processing circuit 33 performs an operation by executing a subprogram may be simply expressed as that the subprogram performs the operation.

The at least one peripheral driver 33_2 may perform an operation specialized for at least one peripheral included in the peripherals 16, and may provide an interface independent from the peripherals 16 to other subprograms of the processing circuit 33. For example, the peripheral driver 33_2 may convert the sample input IN provided from the peripherals 16 into data having a common format.

The at least one algorithm 33_4 may generate output data OUT from the sample input IN. For example, the at least one algorithm 33_4 may convert the sample input IN into output data OUT that may be identified by the host 11, or may generate data including useful information by processing the sample input IN. In the latter case, due to periodically received sample input IN, the at least one algorithm 33_4 may periodically generate data from the sample input IN, and accordingly, as will be described below with reference to FIG. 8A, data generated by the at least one algorithm 33_4 may be handled equally with the sample input IN received from the peripherals 16, and accordingly, the at least one algorithm 33_4 may be referred to as a virtual peripheral.

The table manager 33_6 may manage an active time table 22 stored in the memory 20. For example, the table manager 33_6 may identify a scan mode, and may generate an active time table 22 in the scan mode and store it in the memory 20. The active time table 22 may include, as an entry, a time required to process the sample input IN of each of the peripherals 16 under each of a plurality of operating conditions, and may be referred to by the DVFS controller 33_8 to be described below. An example of the active time table 22 will be described below with reference to FIG. 4.

The DVFS controller 33_8 may identify an optimal operating condition of the hub device 30 based on the processing time and period of the sample input IN, and may generate the control signal CTR, which is provided to the DVFS circuit 14, based on an identified operating condition. Examples of the operation of the DVFS controller 33_8 will be described below with reference to FIG. 5 and the like.

Figure 4:
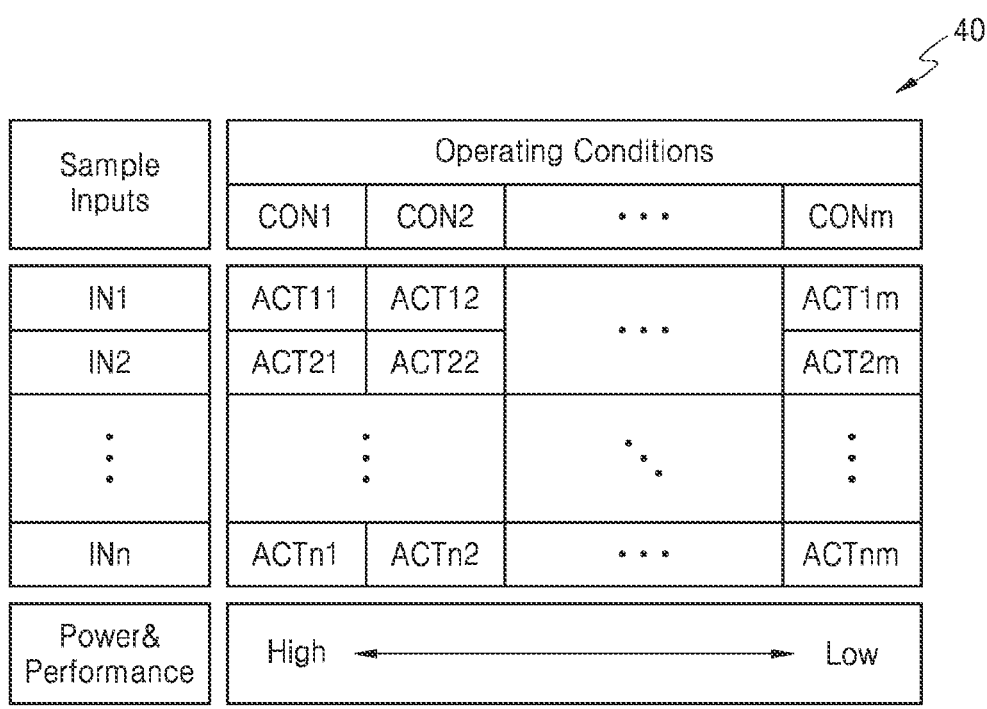
FIG. 4 is a view of an active time table according to an example embodiment of the disclosure.

FIG. 4 is a view of an active time table 40 according to an example embodiment of the disclosure. As described above with reference to FIG. 3, the active time table 40 may be stored in the memory 20 and may be referenced by the processing circuit 33. Hereinafter, FIG. 4 will be described with reference to FIG. 3, and it is assumed that the memory 20 of FIG. 3 stores the active time table 40 of FIG. 4.

The active time table 40 may include, as an entry, the processing time of a sample input in each of a plurality of operating conditions. For example, as shown in FIG. 4, the active time table 40 may include, as entries, m*n active times ACT11 to ACTnm (where m and n are integers greater than 1) corresponding to combinations between first to m-th operating conditions CON1 to CONm and first to n-th sample inputs IN1 to INn. The first to m-th operating conditions CON1 to CONm may correspond to different power consumptions and performances, respectively, and as shown in FIG. 4, the first operating condition CON1 may correspond to the highest power consumption and performance. In addition, the m-th operating condition CONm may correspond to the lowest power consumption and performance. In addition, each of the first to n-th sample inputs IN1 to INn may be provided from one peripheral or may correspond to one of the at least one algorithm 33_4 of FIG. 3.

For dynamic voltage-frequency scaling of the hub device 30, unlike in the active time table 40 shown in FIG. 4, an input pattern table that stores operating conditions corresponding to patterns of sample inputs may be used. However, the input pattern table may be completely modified when peripherals are changed, and when one peripheral is added, data corresponding to a plurality of input patterns may be added to the input pattern table. On the other hand, because the active time table 40 of FIG. 4 stores processing times respectively corresponding to the peripherals, when a change in the peripherals occurs, only a corresponding entry may be deleted and/or added, and thus, the active time table 40 may be managed more easily.

Figure 5:
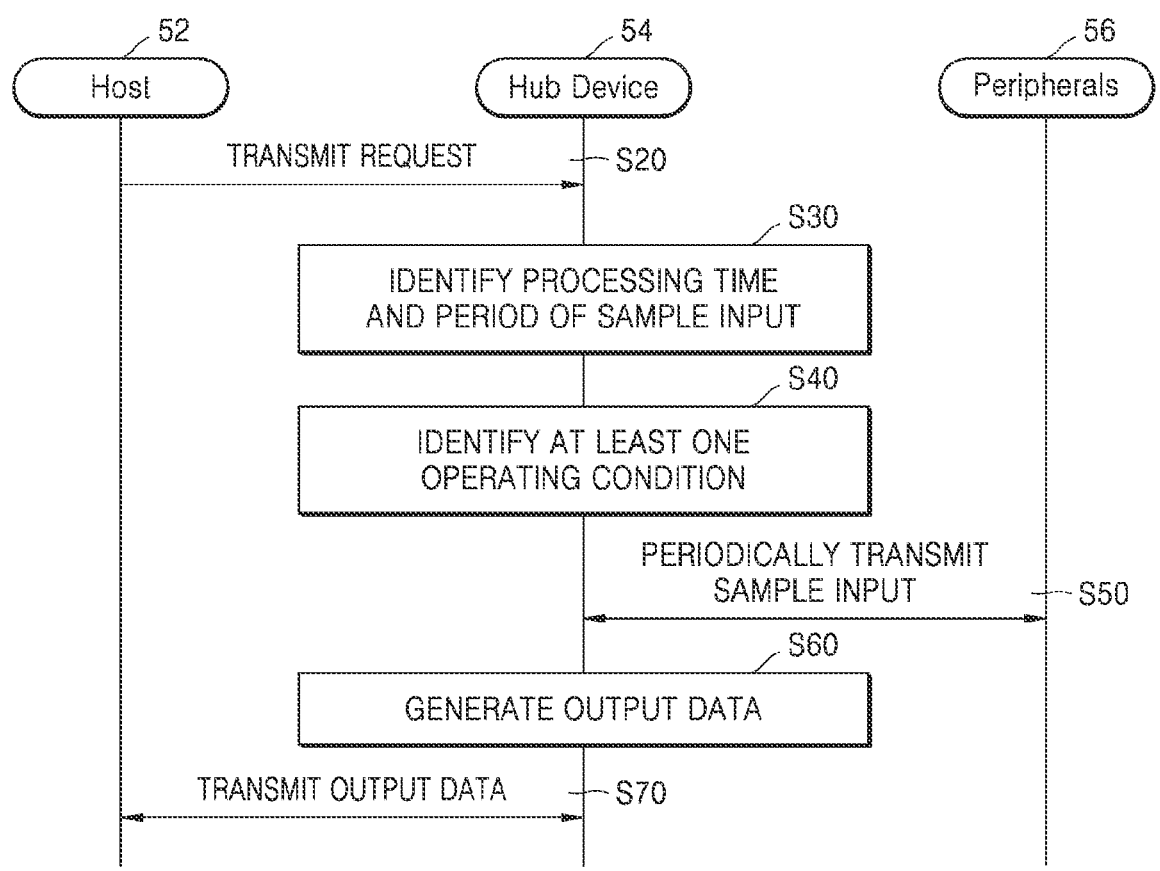
FIG. 5 is a flowchart of a method of interfacing peripherals, according to an example embodiment of the disclosure.

FIG. 5 is a flowchart of a method of interfacing peripherals, according to an example embodiment of the disclosure. As described above with reference to FIG. 1, a hub device 54 may be between a host 52 and peripherals 56 and interface the peripherals 56 with the host 52.

Referring to FIG. 5, in operation S20, the host 52 may transmit a request REQ to the hub device 54. As described above with reference to FIG. 1, the request REQ may instruct enablement of at least one of the peripherals 56 and may instruct periodic reception and processing of a sample input IN provided from the peripherals 56.

In operation S30, the hub device 54 may identify the processing time and period of the sample input IN. For example, the hub device 54 may identify the period of the sample input IN based on the request REQ received from the host 52 and may identify the processing time of the sample input IN corresponding to the request REQ by referring to an active time table.

In operation S40, the hub device 54 may identify at least one operating condition. For example, the hub device 54 may identify at least one operating condition based on the processing time and period of the sample input IN identified in operation S30. As described above with reference to FIG. 2, the identified at least one operating condition may correspond to an operating condition under which the processing of the sample input IN may be completed within a period from among a plurality of operating conditions. The hub device 54 may select one of the identified at least one operating condition, and may operate under the selected operating condition by generating a control signal CTR. An example of operation S40 will be described below with reference to FIG. 6.

In operation S50, the peripherals 56 may periodically transmit a sample input IN to the hub device 54. For example, the hub device 54 may periodically receive the sample input IN from the peripherals 56 by communicating with the peripherals 56 based on the request REQ. Even though the operating condition identified in operation S40 varies, the period of the sample input IN may be maintained.

In operation S60, the hub device 54 may generate output data OUT. For example, the hub device 54 may generate output data OUT by converting the sample input IN received in operation S50 or processing the sample input IN. The output data OUT may correspond to a response to the request REQ transmitted by the host 52 in operation S20.

In operation S70, the hub device 54 may transmit the output data OUT to the host 52. In some embodiments, as will be described below with reference to FIGS. 9 and 10, the hub device 54 may detect a loss of processing of the sample input IN based on the transmission of the output data OUT, and when the loss of the processing of the sample input IN is detected, the hub device 54 may change the operating condition identified in operation S40.

Figure 6:
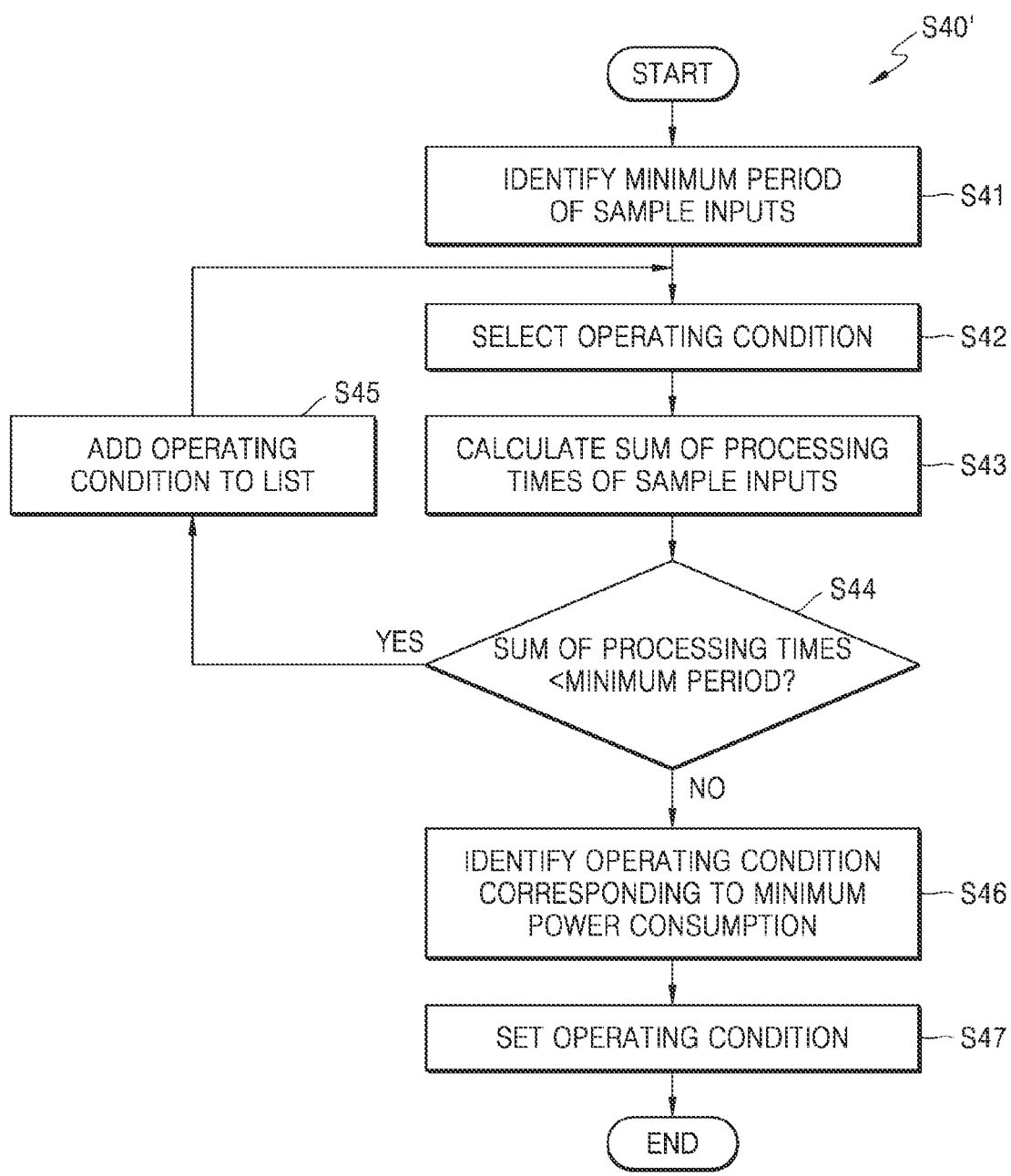
FIG. 6 is a flowchart of a method of interfacing peripherals, according to an example embodiment of the disclosure.

FIG. 6 is a flowchart of a method of interfacing peripherals, according to an example embodiment of the disclosure. Specifically, the flowchart of FIG. 6 shows an example of operation S40 of FIG. 5, and as described above with reference to FIG. 5, at least one operating condition may be identified in operation S40' of FIG. 6. As shown in FIG. 6, operation S40' may include a plurality of operations S41 to S47. In some embodiments, operation S40' may be performed by the DVFS controller 33_8 executed by the processing circuit 33 of FIG. 3, and FIG. 6 will be described below with reference to FIGS. 3 and 5.

Referring to FIG. 6, in operation S41, a minimum period of sample inputs may be identified. For example, the processing circuit 33 may identify a minimum period among periods identified in operation S30 of FIG. 5. As will be described below with reference to FIG. 7, the processing of sample inputs may be required to be completed within a minimum period identified in the worst case, and thus the minimum period may be used to identify operating conditions.

In operation S42, an operating condition may be selected. For example, the processing circuit 33 may select one of a plurality of operating conditions included in the active time table 22. In some embodiments, the processing circuit 33 may sequentially select operating conditions from an operating condition (e.g., CON1 in FIG. 4) corresponding to the highest power and performance to an operating condition (e.g., CONm in FIG. 4) corresponding to the lowest power and performance from among a plurality of operating conditions.

In operation S43, the sum of processing times of the sample inputs may be calculated. For example, the processing circuit 33 may identify processing times corresponding to the sample inputs identified in operation S30 of FIG. 3 from the active time table 22 under the operating condition selected in operation S42, and may calculate the sum of the identified processing times. For example, referring to the active time table 40 of FIG. 4, when the first and second sample inputs IN1 and IN2 are enabled by the request REQ of the host 11, the processing circuit 33 may select the second operating condition CON2 and calculate the sum of the active times ACT12 and ACT22.

In operation S44, the sum of the processing times may be compared with the minimum period. For example, the processing circuit 33 may compare the minimum period identified in operation S41 with the processing times calculated in operation S43. As shown in FIG. 6, when the sum of the processing times is less than the minimum period, operation S45 may be subsequently performed, while when the sum of the processing times is greater than or equal to the minimum period, operation S46 may be subsequently performed.

When the sum of the processing times is less than the minimum period, an operating condition may be added to a list in operation S45. For example, when the sum of the processing times of the sample inputs is less than the minimum period under a selected operating condition, the processing circuit 33 may determine that the hub device 30 may normally perform an operation corresponding to the request REQ of the host 11, and may add a selected operating condition to the list. As shown in FIG. 6, a new operating condition may be selected in operation S42 following operation S45, and accordingly, the list may include at least one available operating condition for the request REQ of the host 11 from among a plurality of operating conditions. Accordingly, at least one operating condition may be identified.

When the sum of the processing times is greater than or equal to the minimum period, an operating condition corresponding to minimum power consumption may be identified in operation S46. For example, the processing circuit 33 may identify an operating condition corresponding to the minimum power consumption from among operating conditions included in the list. In the example of FIG. 6, the processing circuit 33 may select a plurality of operating conditions in a descending order of power consumption and performance, and accordingly, the processing circuit 33 may identify, in operation S46, an operating condition last added to the list.

In operation S47, an operating condition may be set. For example, the processing circuit 33 may generate a control signal CTR corresponding to the operating condition identified in operation S46 and may provide the control signal CTR to the DVFS circuit 14. The DVFS circuit 14 may provide a power supply voltage VDD and a clock signal CLK to the hub device 30 based on the control signal CTR, and the hub device 30 may operate under the identified operating condition.

Figure 7:
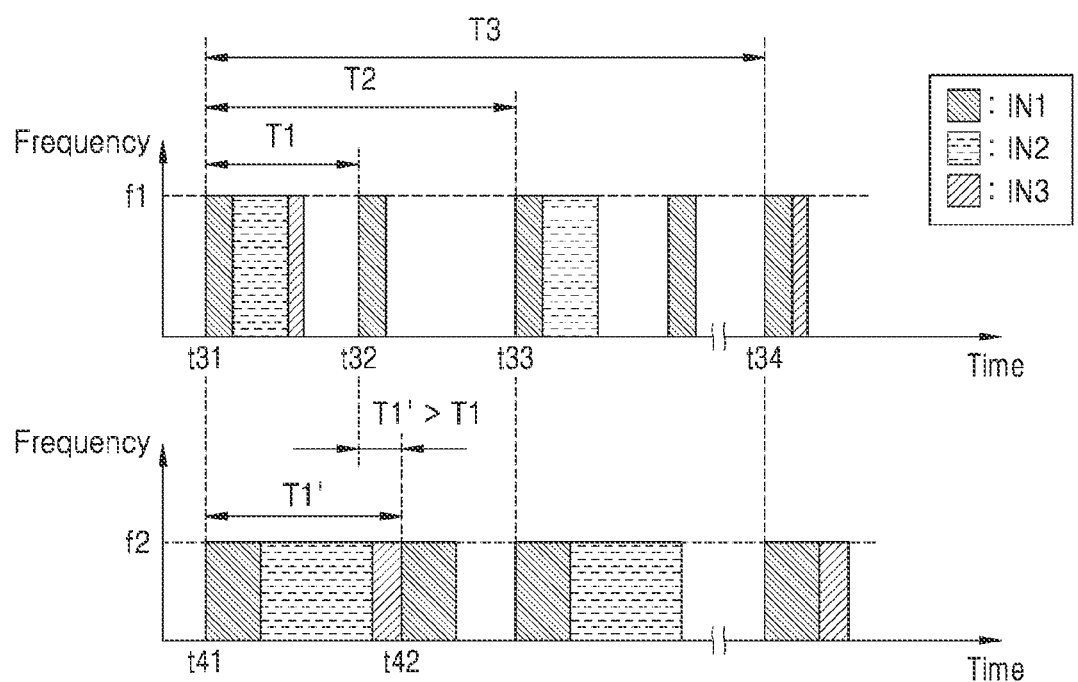
FIG. 7 is a timing diagram illustrating an operation of a hub device, according to an example embodiment of the disclosure.

FIG. 7 is a timing diagram illustrating an operation of a hub device, according to an example embodiment of the disclosure. Specifically, as an example of different operating conditions, the timing diagram of FIG. 7 shows examples of operations of the hub device 12 of FIG. 1 at different frequencies of the clock signal CLK. As shown in FIG. 7, first to third sample inputs IN1 to IN3 may correspond to different periods, that is, first to third periods T1 to T3, respectively (T1<T2<T3). In FIG. 7, it is assumed that a first frequency f1 is higher than a second frequency f2 (f1>f2). Hereinafter, FIG. 7 will be described with reference to FIG. 1, and descriptions that are the same as those of FIG. 2 will be omitted.

Referring to the upper part of FIG. 7, when the clock signal CLK has the first frequency f1, the first to third sample inputs IN1 to IN3 may be processed from time t31 to time t32. The first sample input IN1 may have a first period T1 that is the shortest period among the first to third periods T1 to T3, and thus may be processed at each of time t32 and time t33. The second sample input IN2 may have a second period T2, which is longer than the first period T1, and may be processed after the first sample input IN1. The third sample input IN3 may have a third period T3 that is the longest period among the first to third periods T1 to T3, and thus may be processed after the first sample input IN1. As shown in the upper part of FIG. 7, all of the first to third sample inputs IN1 to IN3 may be processed from time t31 to time t32, that is, within the first period T1, and accordingly, a loss of the processing of the first to third sample inputs IN1 to IN3 may not occur.

Referring to the lower part of FIG. 7, when the clock signal CLK has the second frequency f2, the first to third sample inputs IN1 to IN3 may be processed from time t41 to time t42. Accordingly, the first sample input IN1 may be processed again at time t42, and a period T1' from time t41 to time t42 may be longer than the first period T1 (T1'>T1). Accordingly, the processing of the first sample input IN1 may be delayed, and when operating in synchronization with the clock signal CLK having the second frequency f2, the hub device 12 may not normally respond to the request REQ of the host 11. When the first sample input IN1 is processed every first period T1 unlike as shown in the lower part of FIG. 7, the processing of the second sample input IN2 and/or the third sample input IN3 may be stopped or omitted, and accordingly, the hub device 12 may not normally respond to the request REQ of the host 11. The hub device 12 may identify a minimum period among the periods of sample inputs, as described above with reference to FIG. 6, in order to exclude the operating condition shown at the lower part of FIG. 7, and may identify an operating condition such that the sum of processing times of the sample inputs is less than the minimum period.

Figure 8A:
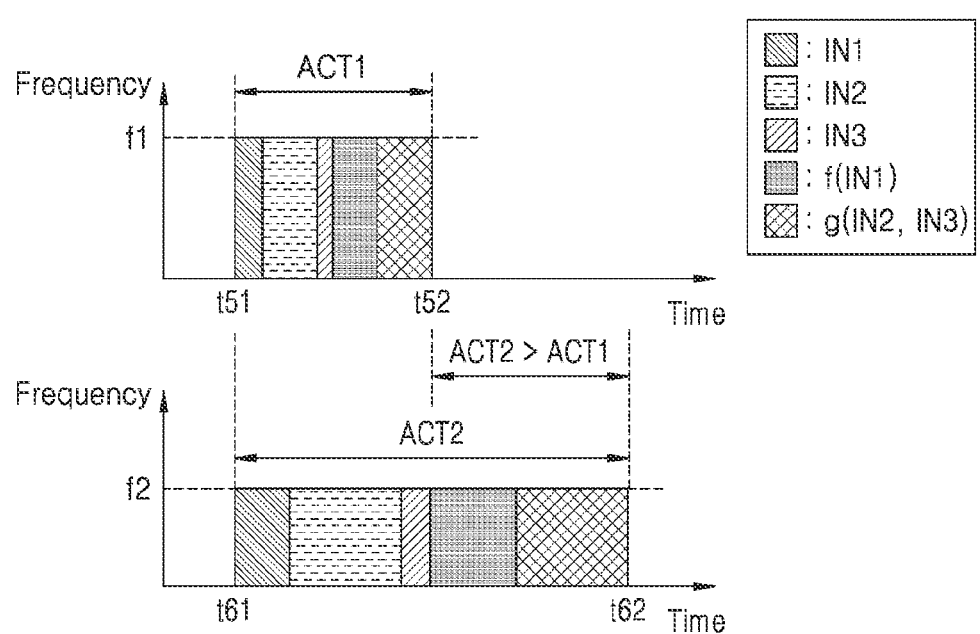
FIGS. 8A and 8B are timing diagrams illustrating operations of a hub device, according to example embodiments of the disclosure.
Figure 8B:
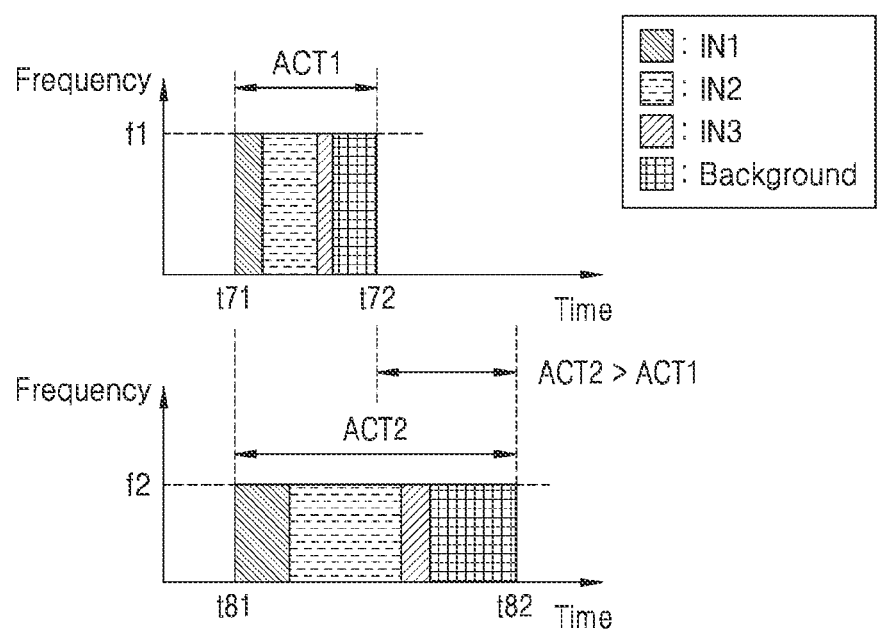

FIGS. 8A and 8B are timing diagrams illustrating operations of a hub device, according to example embodiments of the disclosure. Specifically, the timing diagram of FIG. 8A shows an example of an operation of processing data generated from a sample input IN received from peripherals, and the timing diagram of FIG. 8B shows an example of an operation including a background operation. In FIGS. 8A and 8B, it is assumed that a first frequency f1 is higher than a second frequency f2 (f1>f2). Hereinafter, FIGS. 8A and 8B will be described with reference to FIG. 3, and descriptions of FIGS. 8A and 8B that are the same as those of FIG. 2 will be omitted.

Referring to FIG. 8A, a processing time of data generated from a sample input IN may be used to identify an operating condition. For example, as described above with reference to FIG. 3, the at least one algorithm 33_4 may generate data including useful information from the sample input IN. In the example of FIG. 8A, the at least one algorithm 33_4 may generate first data f(IN1) from a first sample input IN1, and may generate second data g(IN2, IN3) from second and third sample inputs IN2 and IN3. The processing circuit 33 may determine a time taken to generate the first and second data f(IN1) and g(IN2, IN3) as well as processing times of the first to third sample inputs IN1 to IN3. In some embodiments, the active time table 22 may include the time taken to generate the first and second data f(IN1) and g(IN2, IN3) as well as the processing times of the first to third sample inputs IN1 to IN3, in each of a plurality of operating conditions, and the processing circuit 33 may identify the time taken to generate the first and second data f(IN1) and g(IN2, IN3) by referring to the active time table 22.

Referring to the upper part of FIG. 8A, when the clock signal CLK has a first frequency f1, the first to third sample inputs IN1 to IN3 may be processed and the first and second data f(IN1) and g(IN2, IN3) may be generated from time t51 to time t52. That is, during a first active time ACT1, the first to third sample inputs IN1 to IN3 may be processed and the first and second data f(IN1) and g(IN2, IN3) may be generated. Referring to the lower part of FIG. 8A, when the clock signal CLK has a second frequency f2, the first to third sample inputs IN1 to IN3 may be processed and the first and second data f(IN1) and g(IN2, IN3) may be generated from time t61 to time t62. That is, during a second active time ACT2, the first to third sample inputs IN1 to IN3 may be processed and the first and second data f(IN1) and g(IN2, IN3) may be generated. The second active time ACT2 may be longer than the first active time ACT1 (ACT2>ACT1).

Referring to FIG. 8B, the execution time of a background operation may be used to identify an operating condition. For example, the processing circuit 33 may periodically perform a background operation, and the background operation may include, as a non-limiting example, an operation for switching processing of sample inputs, a monitoring operation, an interrupt processing operation, and the like. The execution time of the background operation may also vary according to an operating condition. In some embodiments, the memory 20 may store the execution time of the background operation in each of a plurality of operating conditions, and the processing circuit 33 may access the memory 20 to identify the execution time of the background operation. Herein, a time required to perform the background operation may be referred to as background time.

Referring to the upper part of FIG. 8B, when the clock signal CLK has a first frequency f1, the first to third sample inputs IN1 to IN3 may be processed and a background operation may be performed from time t71 to time t72. That is, during a first active time ACT1, the first to third sample inputs IN1 to IN3 may be processed and the background operation may be performed. Referring to the lower part of FIG. 8B, when the clock signal CLK has a second frequency f2, the first to third sample inputs IN1 to IN3 may be processed and a background operation may be performed from time t81 to time t82. That is, during a second active time ACT2, the first to third sample inputs IN1 to IN3 may be processed and the background operation may be performed. The second active time ACT2 may be longer than the first active time ACT1 (ACT2>ACT1).

Figure 9:
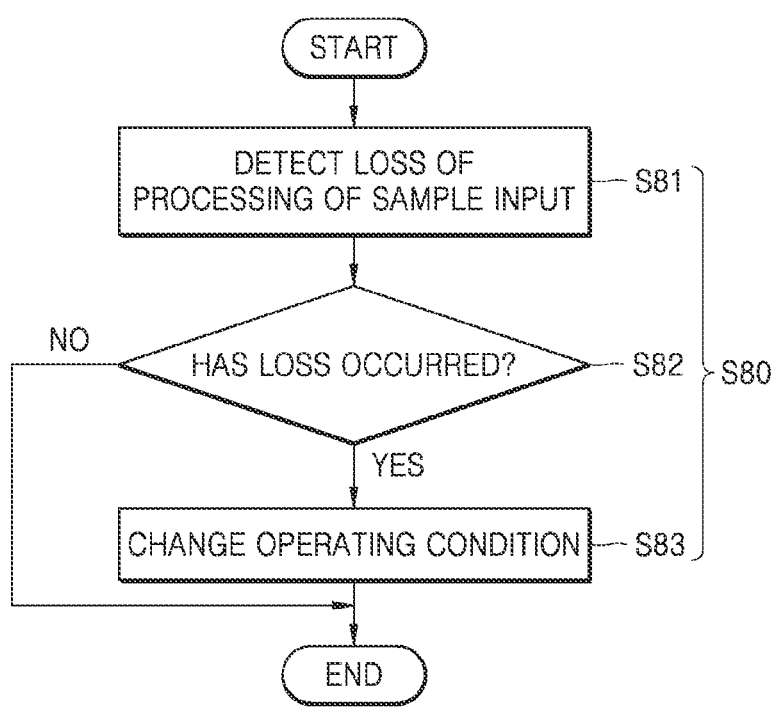
FIG. 9 is a flowchart of a method of interfacing peripherals, according to an example embodiment of the disclosure.

FIG. 9 is a flowchart of a method of interfacing peripherals, according to an example embodiment of the disclosure. As shown in FIG. 9, operation S80 may include a plurality of operations S81, S82, and S83, and an operating condition may be changed based on the loss of processing of a sample input IN in operation S80. In some embodiments, operation S80 may be performed by the DVFS controller 33_8 executed by the processing circuit 33 of FIG. 3, and may be repeatedly performed subsequent to operation S70 of FIG. 5. Hereinafter, FIG. 9 will be described with reference to FIGS. 3 and 5.

In operation S81, the loss of the processing of the sample input IN may be detected. For example, the processing circuit 33 may detect the loss of the processing of the sample input IN while operating under an operating condition identified and set based on the processing time and period of the sample input IN. The loss of the processing of the sample input IN may occur due to various causes. For example, the processing circuit 33 may process a temporary operation having a high priority, such as an interrupt processing operation, and the processing of sample inputs may be delayed due to a time required to perform the temporary operation, and accordingly, the processing circuit 33 may not normally respond to the request REQ of the host 11. Herein, the loss of processing of the sample input IN may be simply referred to as a loss of the sample input IN.

In operation S82, it may be determined whether a loss of the sample input IN has occurred. As shown in FIG. 9, when the loss of the sample input IN occurs, that is, when the loss of the sample input IN is detected in operation S81, operation S83 may be subsequently performed. On the other hand, when the loss of the sample input IN does not occur, operation S80 may be terminated.

When the loss of the sample input IN occurs, the operating condition may be changed in operation S83. For example, when the loss of the sample input IN occurs, the processing circuit 33 may determine that the current operating condition is inappropriate, and thus may change the operating condition by identifying an operating condition corresponding to higher power consumption and performance. The processing circuit 33 may generate a control signal CTR corresponding to the changed operating condition and may provide the control signal CTR to the DVFS circuit 14.

Figure 10:
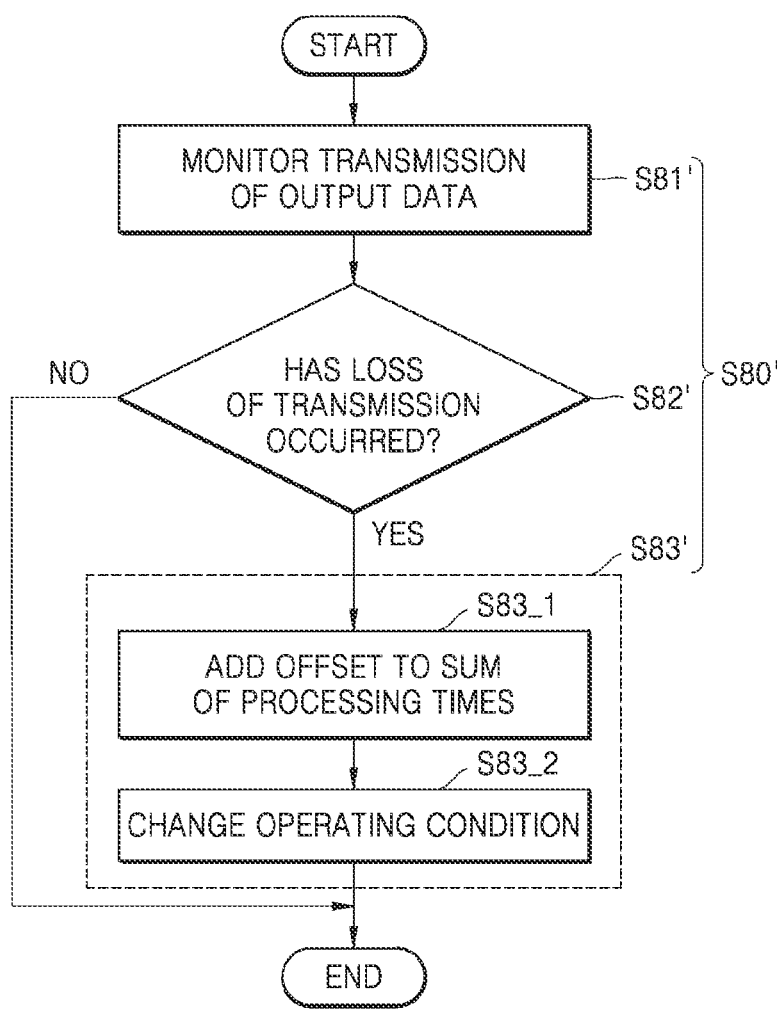
FIG. 10 is a flowchart of a method of interfacing peripherals, according to an example embodiment of the disclosure.

FIG. 10 is a flowchart of a method of interfacing peripherals, according to an example embodiment of the disclosure. Specifically, the flowchart of FIG. 10 shows an example of operation S80 of FIG. 9. As described above with reference to FIG. 9, an operating condition may be changed based on the loss of the sample input IN in operation S80' of FIG. 10. As shown in FIG. 10, operation S80' may include a plurality of operations S81' to S83', and operation S83' may include operations S83_1 and S83_2. Hereinafter, a description of FIG. 10 that is the same as the description of FIG. 9 will be omitted.

Referring to FIG. 10, transmission of output data OUT may be monitored in operation S81'. For example, the processing circuit 33 may provide the output data OUT to the host 11 through inter-process communication (IPC). The processing circuit 33 may monitor the transmission of the output data OUT by monitoring the IPC, and when the transmission of the output data OUT corresponding to the sample input IN is lost, the processing circuit 33 may determine a loss of the sample input IN.

In operation S82', it may be determined whether a loss of the transmission of the output data OUT occurs. As shown in FIG. 10, when the loss of the transmission of the output data OUT occurs, that is, when the loss of the sample input IN occurs, operation S83' may be subsequently performed. On the other hand, when the loss of the transmission of the output data OUT does not occur, operation S80' may be terminated.

When the loss of the transmission of the output data OUT occurs, an offset may be added to the sum of processing times in operation S83_1. For example, the processing circuit 33 may add an offset to the sum of the processing times of the sample inputs calculated in operation S43 of FIG. 6, and accordingly, an operating condition may be identified based on the sum of extended processing times. In some embodiments, the processing circuit 33 may add an offset to the sum of the processing times of the sample inputs by increasing a value representing the execution time of the background operation described above with reference to FIG. 8B.

In operation S83_2, an operating condition may be identified. For example, the processing circuit 33 may perform operation S40' of FIG. 6 based on the sum of the processing times extended in operation S83_1. That is, the processing circuit 33 may compare the sum of the extended processing times with a minimum period, and may identify at least one operating condition according to a comparison result. Furthermore, the processing circuit 33 may select an operating condition corresponding to minimum power consumption from among the identified at least one operating condition, and may change the current operating condition to the selected operating condition.

Figure 11:
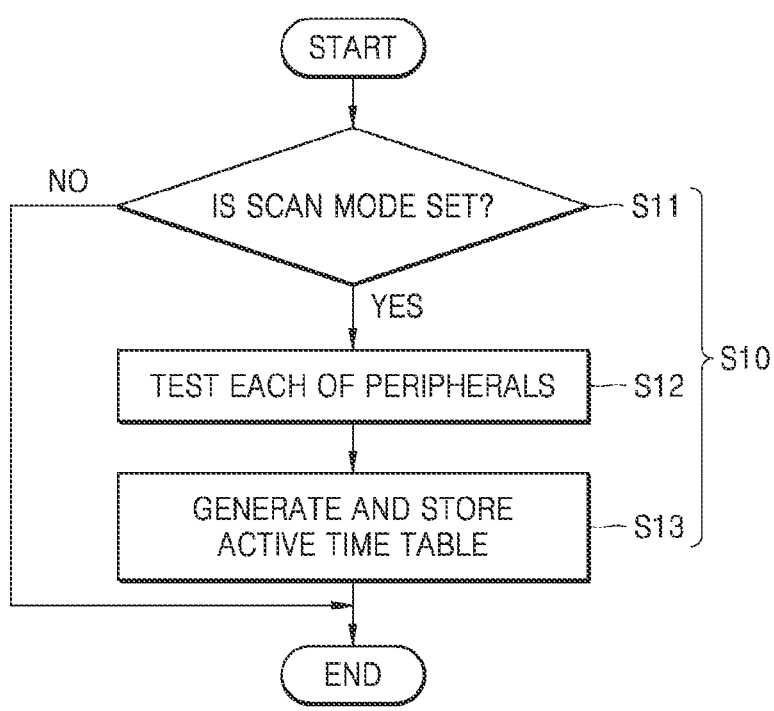
FIG. 11 is a flowchart of a method of interfacing peripherals, according to an example embodiment of the disclosure.

FIG. 11 is a flowchart of a method of interfacing peripherals, according to an example embodiment of the disclosure. As shown in FIG. 11, operation S10 may include a plurality of operations S11 to S13, and an active time table may be generated in operation S10. In some embodiments, operation S10 may be performed by the table manager 33_6 executed by the processing circuit 33 of FIG. 3. In some embodiments, operation S10 may be performed before operation S20 of FIG. 5, and may be performed, for example, in a process of manufacturing a system (e.g., the system 10 of FIG. 1) including the hub device 30 and peripherals. Hereinafter, FIG. 11 will be described with reference to FIGS. 3 and 5.

In operation S11, it may be determined whether or not a scan mode is set. For example, in a process of manufacturing a system including the hub device 30, the hub device 30 may be set to a scan mode. As described above with reference to FIG. 1, a user of the hub device 30 (or a device including the hub device 30 and a host), that is, a manufacturer of a system including the hub device 30 and peripherals, may set the hub device 30 (or the device including the hub device 30 and the host) to a scan mode during a process of manufacturing the system. The scan mode may correspond to an operation mode in which an active time table is generated by scanning peripherals. As shown in FIG. 11, when the hub device 30 is set to the scan mode, operation S12 may be subsequently performed, while when the hub device 30 is not set to the scan mode, operation S10 may be terminated.

When the hub device 30 is set to the scan mode, each of the peripherals may be tested in operation S12. For example, the processing circuit 33 may enable the peripherals mutually exclusively under each of a plurality of operating conditions, and may detect processing times of the sample input IN by testing the enabled peripherals. In some embodiments, testing of the peripherals may be performed in response to a request REQ provided by the host, and the host (or an application executed by the host) may generate an active time table by using the hub device 30. An example of operation S12 will be described below with reference to FIG. 12.

In operation S13, the active time table 22 may be generated and stored in the memory 20. For example, the processing circuit 33 may generate an active time table 22 including the processing times detected in operation S12 and may store the active time table 22 in the memory 20. In some embodiments, the processing circuit 33 may provide a generated active time table to the host and the host may store the generated active time table in a nonvolatile memory and may load the stored active time table in the memory 20 after the system is booted.

Figure 12:
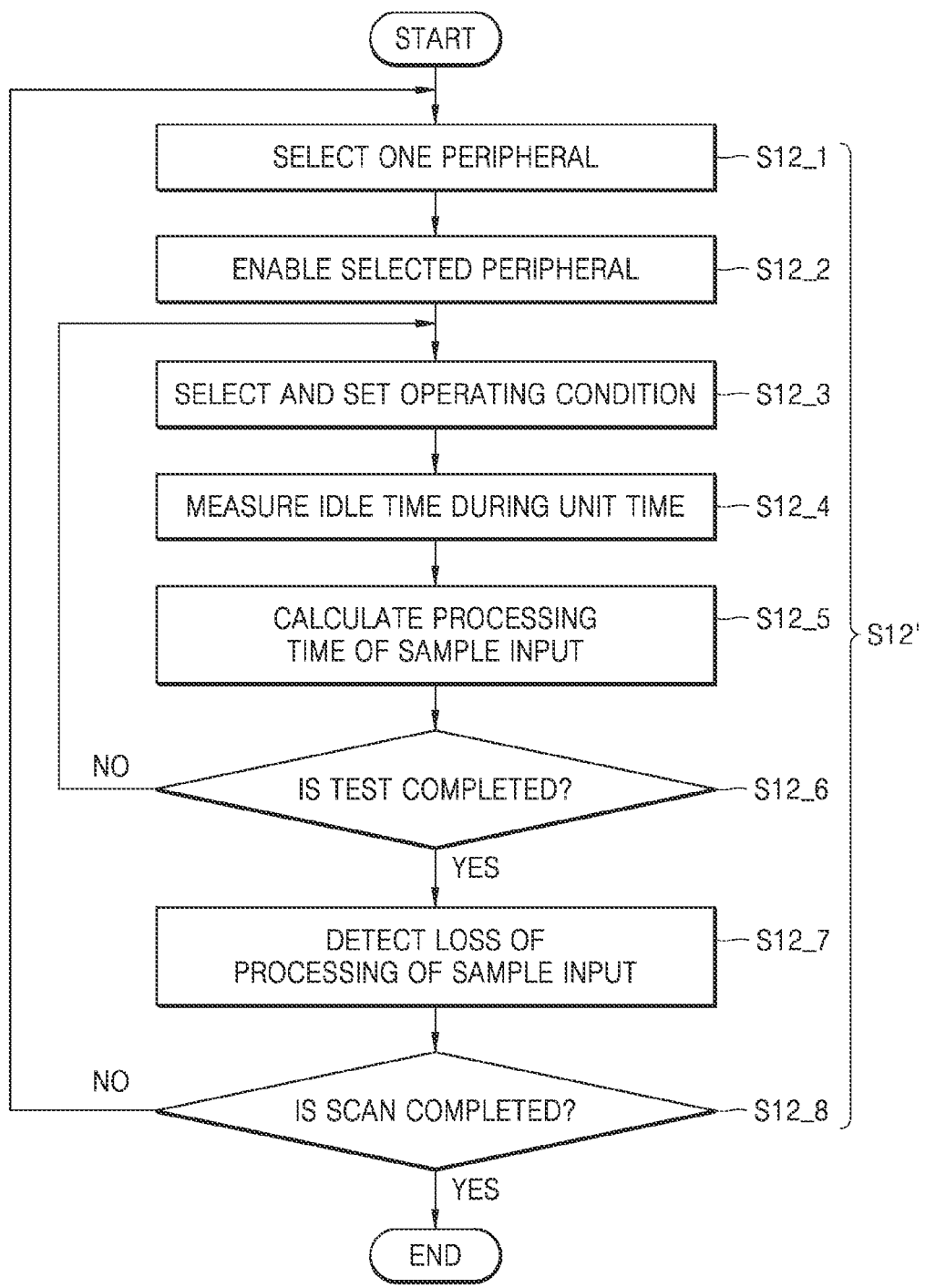
FIG. 12 is a flowchart of a method of interfacing peripherals, according to an example embodiment of the disclosure.

FIG. 12 is a flowchart of a method of interfacing peripherals, according to an example embodiment of the disclosure. Specifically, the flowchart of FIG. 12 shows an example of operation S12 of FIG. 11. As described above with reference to FIG. 11, each of the peripherals may be tested in operation S12' of FIG. 12. As shown in FIG. 12, operation S12' may include a plurality of operations S12_1 to S12_8. In some embodiments, operation S12' may be performed by the table manager 33_6 executed by the processing circuit 33 of FIG. 3. Hereinafter, FIG. 12 will be described with reference to FIGS. 3 and 11.

In operation S12_1, one peripheral may be selected. For example, the processing circuit 33 may sequentially select each of the peripherals. In operation S12_2, the selected peripheral may be enabled. For example, the processing circuit 33 may periodically receive a sample input IN from the enabled peripheral.

In operation S12_3, an operating condition may be selected and set. For example, the processing circuit 33 may sequentially select each of a plurality of operating conditions and may generate a control signal CTR corresponding to the selected operating condition. In operation S12_4, an idle time may be measured during a unit time. For example, the processing circuit 33 may measure an idle time excluding a time (i.e., an active time) required to process the sample input IN during 1 second. In some embodiments, unlike in FIG. 12, the processing circuit 33 may measure a time (i.e., an active time) required to process the sample input IN during a unit time.

In operation S12_5, a processing time of the sample input IN may be calculated. For example, the processing circuit 33 may calculate a processing time of the sample input IN based on Equation 1 below.

$$ACT = T*(1 - \text{idle\_time}) \qquad \text{[Equation 1]}$$

In Equation 1, ACT may represent a processing time of the sample input IN, T may represent a period of the sample input IN, and idle_time may represent an idle time measured during 1 second.

In operation S12_6, it may be determined whether or not the test of a peripheral is completed. For example, when all the times required to process the sample input IN, which is provided from the selected peripheral, in each of the plurality of operating conditions are calculated, it may be determined that the test is completed. As shown in FIG. 12, when it is determined that the test is completed, operation S12_7 may be subsequently performed, while when the test is not completed, that is, when an operating condition for testing the selected peripheral remains, operation S12_3 to operation S12_5 may be performed again.

When the test is completed, the selected peripheral may be disabled in operation S12_7. For example, the processing circuit 33 may no longer receive or process the sample input IN from the selected peripheral. In operation S12_8, it may be determined whether the scan for the peripherals is completed. For example, the processing circuit 33 may determine that the scan is completed when all tests of each of the peripherals are completed. As shown in FIG. 12, when the scan is completed, operation S12' may be terminated, while when the scan is not completed, that is, when a peripheral to be tested remains, operations S12_1 to S12_7 may be subsequently performed. Finally, when operation S12' is finished, processing times of sample inputs provided by the peripherals under each of a plurality of operating conditions may be obtained.

Figure 13:
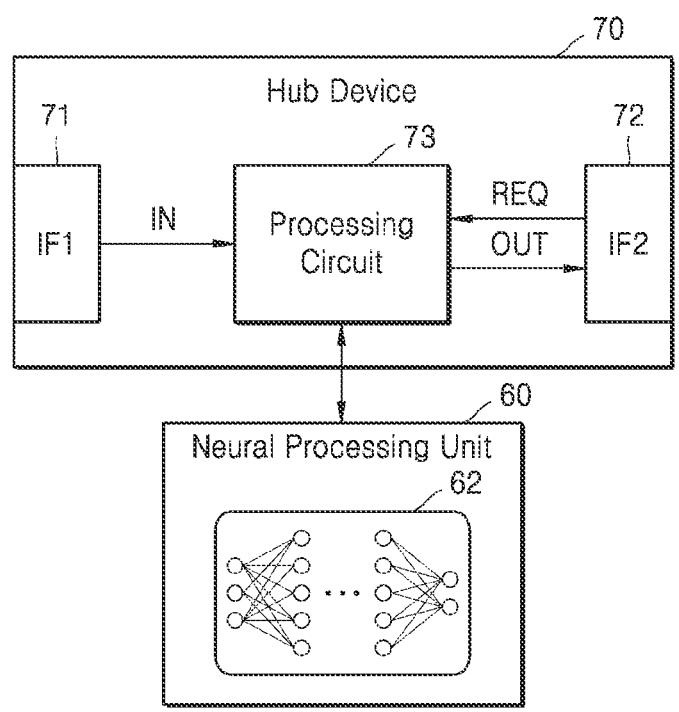
FIG. 13 is a block diagram of a hub device according to an example embodiment of the disclosure.

FIG. 13 is a block diagram of a hub device 70 according to an example embodiment of the disclosure. Specifically, the block diagram of FIG. 13 shows a hub device 70 that interfaces peripherals based on a machine learning model 62. As shown in FIG. 13, the hub device 70 may include a first interface 71, a second interface 72, and a processing circuit 73, similar to the hub device 30 of FIG. 3. In addition, the hub device 70 may communicate with a neural processing unit (NPU) 60 that executes the machine learning model 62. In some embodiments, unlike in FIG. 13, the NPU 60 may be included in the hub device 70.

The processing circuit 73 may interface peripherals by using the machine learning model 62 trained by a plurality of samples. In some embodiments, the machine learning model 62 may have a state trained by a plurality of samples of a sample input. The processing circuit 73 may receive a time required to perform the background operation of FIG. 8B from the machine learning model 62 by providing a sample input IN to the machine learning model 62. Also, in some embodiments, the machine learning model 62 may have a state trained by a plurality of samples of processing time of a sample input. The processing circuit 73 may obtain processing times respectively corresponding to a plurality of operating conditions by providing the machine learning model 62 with a processing time of the sample input IN calculated under one operating condition in the scan mode, and may generate an active time table based on the obtained processing times. In addition, in some embodiments, the machine learning model 62 may learn a sample input IN and a processing time and/or period of the sample input IN, and may output scores corresponding to a plurality of operating conditions. The processing circuit 73 may identify an operating condition based on the scores provided from the machine learning model 62, and in this case, the active time table of FIG. 3 may be omitted.

The NPU 60 may refer to any device that executes the machine learning model 62. In some embodiments, the NPU 60 may be a dedicated hardware block designed to execute the machine learning model 62, or may be a software block that is executed by the processing circuit 73 of the hub device 70, a processor included in a host, or another processor. The machine learning model 62 may be any model trained by a plurality of samples, for example, a model based on an artificial neural network, a decision tree, a support vector machine, a regression analysis, a Bayesian network, a genetic algorithm, or the like. When the machine learning model 62 is based on an artificial neural network as shown in FIG. 13, the artificial neural network may include, as a non-limiting example, a convolution neural network (CNN), a region with convolution neural network (R-CNN), a region proposal network (RPN), a recurrent neural network (RNN), a stacking-based deep neural network (S-DNN), a state-space dynamic neural network (S-SDNN), a deconvolution network, a deep belief network (DBN), a restricted Boltzmann machine (RBM), a fully convolutional network, a long short-term memory (LSTM) network, or a classification network.

Figure 14:
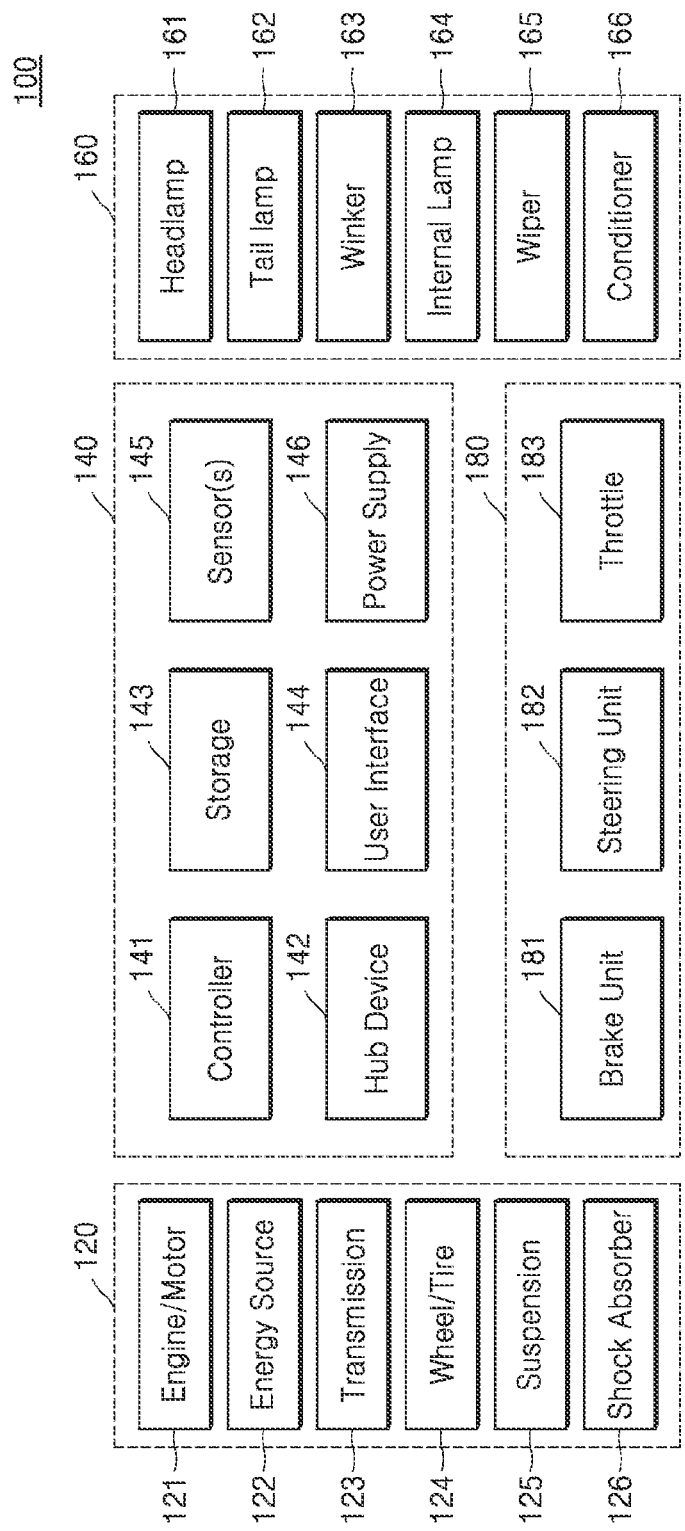
FIG. 14 is a block diagram of a vehicle according to an example embodiment of the disclosure.

FIG. 14 is a block diagram of a vehicle 100 according to an example embodiment of the disclosure. As shown in FIG. 14, the vehicle 100 may include a propulsion device 120, an electronic device 140, an auxiliary device 160, and a driving device 180.

The propulsion device 120 may include an engine/motor 121, an energy source 122, a transmission 123, a wheel/tire 124, a suspension 125, and a shock absorber 126. The engine/motor 121 may include any combination between an internal combustion engine, an electric motor, a steam engine, and a Stirling engine. In some embodiments, when the vehicle 100 is a gas-electric hybrid car, the engine/motor 121 may include a gasoline engine and an electric motor. The energy source 122 may be a source of energy that at least partially provides power to the engine/motor 121, and the engine/motor 121 may convert the energy source 122 into kinetic energy.

The energy source 122 may include, in a non-limiting example, at least one of gasoline, diesel, propane, a compressed gas-based fuel, ethanol, a solar panel, a battery, and an electric power source. In some embodiments, the energy source 122 may include at least one of a fuel tank, a battery, a capacitor, and a flywheel. In addition, the energy source 122 may provide energy to other components of the vehicle 100 as well as the engine/motor 121.

The transmission 123 may transmit mechanical power from the engine/motor 121 to the wheel/tire 124. For example, the transmission 123 may include at least one of a gearbox, a clutch, a differential device, and a drive shaft. When the transmission 123 includes drive shafts, the drive shafts may include at least one axle coupled to the wheel/tire 124. The wheel/tire 124 may have various structures for a bicycle, a motorcycle, a four-wheel type vehicle, and the like, and may contact a road surface.

The suspension 125 is a device that supports the weight of the vehicle 100, and may adjust the ground clearance of the vehicle 100 from the road surface and may control a vibration from the road surface, which is transmitted to the vehicle 100. The shock absorber 126 may control a spring vibration transmitted from the road surface while driving, and may help a spring recover to its original state. For example, the shock absorber 126 may control the elasticity of the spring by generating a damping force for stopping the vibration of the spring. In some embodiments, the shock absorber 126 may be included in the suspension 125.

The electronic device 140 may include a controller 141, a hub device 142, a storage 143, a user interface 144, at least one sensor 145, and a power supply 146. The controller 141 may control the vehicle 100 and may also be referred to as an electronic control unit (ECU). For example, the controller 141 may control the driving of the vehicle 100 by controlling the propulsion device 120 and the driving device 180, and may control the auxiliary device 160. The controller 141, which is a host, may indirectly communicate, through the hub device 142, with peripherals, that is, components included in the electronic device 140 and at least some of the components included in the propulsion device 120, the auxiliary device 160, and the driving device 180. The hub device 142 may be between the controller 141 and the peripherals and interface the peripherals with the controller 141. As described above with reference to the drawings, the hub device 142 may identify an optimal operating condition, and thus may have an optimal performance and power consumption.

The storage 143 may store data, and may include, for example, a nonvolatile semiconductor memory device, a volatile semiconductor memory device, or a disk drive. The user interface 144 may include an input device for receiving a user input and an output device for providing an output signal to a user. For example, the input device may include a key pad, a dome switch, a touch pad, a jog wheel, a jog switch, a microphone, or the like. In addition, the output device may include a speaker and/or a buzzer for outputting an audio signal, a display device and/or a light-emitting diode (LED) for outputting a video signal, and the like.

The at least one sensor 145 may include a sensor for detecting a state of the vehicle 100. For example, the at least one sensor 145 may include a motion sensor such as a geomagnetic sensor, an acceleration sensor, or a gyro sensor, and may include a GPS sensor for estimating the position of the vehicle 100. In addition, the at least one sensor 145 may include a sensor for detecting a state around the vehicle 100. For example, the at least one sensor 145 may include a RADAR sensor that detects the presence and/or speed of objects around the vehicle 100 by using a radio signal, and may also include a LIDAR sensor that detects the presence and/or speed of objects around the vehicle 100 by using laser. In addition, the at least one sensor 145 may include at least one image sensor (or a camera module including an image sensor) that photographs the surroundings of the vehicle 100.

The power supply 146 may provide power to at least some of the components of the vehicle 100. For example, the power supply 146 may include a generator that generates power by driving of the vehicle 100 and may include a battery for storing power.

The auxiliary device 160 may include a headlight 161, a tail light 162, a turn indicator (Winker) 163, an interior lighting 164, a wiper 165, and an air conditioning apparatus 166. The headlight 161 may be placed on the front of the vehicle 100, and the tail light 162 may be placed in the rear of the vehicle 100. The turn indicator 163 may be placed on the front, rear, and side of the vehicle 100, and the interior lighting 164 may be placed in a space where the driver is. The wiper 165 may reciprocate on a glass in the front and/or rear of the vehicle 100, and the air conditioning apparatus 166 may include an air conditioner and/or a heater.

The driving device 180 may include a brake unit 181, a steering unit 182, and a throttle 183. The brake unit 181 may be implemented as a combination of mechanisms configured to decelerate the vehicle 100. For example, the brake unit 181 may use friction to reduce the rotational speed of the wheel/tire 124. The steering unit 182 may be implemented as a combination of mechanisms configured to adjust a driving direction of the vehicle 100. The throttle 183 may be implemented as a combination of mechanisms configured to control the operating speed of the engine/motor 121. For example, the throttle 183 may control the amount of mixed gas of fuel air flowing into the engine/motor 121 and control power and thrust.

As is traditional in the field, embodiments may be described and illustrated in terms of blocks which carry out a described function or functions. These blocks, which may be referred to herein as units or modules or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and/or software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure. An aspect of an embodiment may be achieved through instructions stored within a non-transitory storage medium and executed by a processor.

While the disclosure has been particularly shown and described with reference to embodiments thereof, it will be understood that various changes in form and details may be made therein without departing from the spirit and scope of the following claims.

What is claimed is:

1. A device configured to provide an interface with peripherals, the device comprising:
    a first interface configured to receive a request from a host;
    a second interface configured to periodically receive at least one first sample input from the peripherals in response to the request from the host;
    a memory configured to store an active time table including a processing time of a sample input provided by each of the peripherals in each of a plurality of operating conditions respectively corresponding to different power consumptions; and
    a processing circuit configured to identify at least one of the plurality of operating conditions based on the active time table and a period of the at least one first sample input.

2. The device of claim 1, wherein the processing circuit is further configured to:
    calculate a sum of processing times of the at least one first sample input based on the active time table,
    identify a minimum period among periods of the at least one first sample input, and
    identify the at least one operating condition based on the sum of the processing times and the minimum period.

3. The device of claim 2, wherein the processing circuit is further configured to identify the at least one operating condition such that the sum of the processing times is less than the minimum period.

4. The device of claim 2, wherein the processing circuit is further configured to:
identify a background time for a background operation, and
identify the at least one operating condition such that a sum of the background time and the sum of the processing times is less than the minimum period.

5. The device of claim 4, wherein the processing circuit is further configured to identify the background time based on an output of a machine learning model trained by a plurality of samples of a sample input.

6. The device of claim 2, wherein:
the first interface is further configured to transmit, to the host, output data generated by processing the at least one first sample input, and
the processing circuit is further configured to detect a loss of processing of the at least one first sample input based on transmission of the output data and change the at least one operating condition based on the detected loss.

7. The device of claim 6, wherein the processing circuit is further configured to add an offset to the sum of the processing times when the loss is detected.

8. The device of claim 2, wherein the processing circuit is further configured to identify an operating condition corresponding to a minimum power consumption from among the at least one operating condition.

9. The device of claim 1, wherein the processing circuit is further configured to generate the active time table by testing the peripherals in a scan mode and store the generated active time table in the memory.

10. The device of claim 9, wherein the processing circuit is further configured to, in the scan mode, enable each of the peripherals mutually exclusively and measure a processing time of a second sample input of an enabled peripheral under each of the plurality of operating conditions to thereby generate the active time table.

11. The device of claim 10, wherein the processing circuit is further configured to generate the active time table based on a period of the second sample input and a total time taken to process the second sample input during a unit time.

12. The device of claim 9, wherein the processing circuit is further configured to, in the scan mode, measure processing times of sample inputs of the peripherals and generate the active time table based on an output of a machine learning model trained by a plurality of samples of a processing time.

13. The device of claim 1, wherein:
the active time table further includes a processing time of a sample input generated based on each of algorithms according to each of the plurality of operating conditions, and
the processing circuit is further configured to:
periodically generate at least one third sample input by processing the at least one first sample input based on the algorithms, and
identify the at least one operating condition based on the active time table, the period of the at least one first sample input, and a period of the at least one third sample input.

14. The device of claim 1, wherein the plurality of operating conditions respectively correspond to a plurality of dynamic voltage-frequency scaling (DVFS) levels.

15. A device comprising:
a host configured to perform an operation based on information provided from peripherals;
a hub device configured to provide an interface for the peripherals; and
a dynamic voltage-frequency scaling (DVFS) circuit configured to adjust power consumption of the hub device based on a control signal provided from the hub device, wherein
the hub device is configured to periodically receive at least one sample input from the peripherals in response to a request from the host and generate the control signal based on a processing time and period of the at least one sample input,
wherein the hub device is further configured to:
calculate a sum of processing times of the at least one sample input,
identify a minimum period among periods of the at least one sample input, and
generate the control signal based on the sum of the processing times and the minimum period.

16. The device of claim 15, further comprising:
a memory configured to store an active time table including a processing time of a sample input provided by each of the peripherals in each of a plurality of operating conditions respectively corresponding to different power consumptions, wherein
the hub device is further configured to identify a processing time of the at least one sample input from the active time table.

17. A method of operating a hub device to interface with peripherals, the method comprising:
receiving, by the hub device, a request from a host instructing periodic reception of at least one sample input from the peripherals;
identifying, by the hub device, a processing time and period of the at least one sample input; and
identifying, by the hub device, at least one of a plurality of operating conditions corresponding to different power consumptions, based on the processing time and period of the at least one sample input,
wherein the identifying of the at least one operating condition includes:
calculating a sum of processing times of the at least one sample input;
identifying a minimum period among periods of the at least one sample input; and
identifying the at least one operating condition based on the sum of the processing times and the minimum period.

18. The method of claim 17, wherein the identifying of the at least one operating condition includes identifying, based on the sum of the processing times and the minimum period, the at least one operating condition such that the sum of the processing times is less than the minimum period.

* * * * *